US005500775A

United States Patent [19]
Fujita et al.

[11] Patent Number: 5,500,775
[45] Date of Patent: Mar. 19, 1996

[54] DATA RECORDING AND REPRODUCING APPARATUS

[75] Inventors: Kouji Fujita, Yokohama; Shigemitsu Higuchi, Fujisawa; Toshiro Aizawa, Ebina; Atsuo Suga, Kamagaya; Minoru Kosuge, Odawara, all of Japan

[73] Assignee: Hitachi, Ltd., Tokyo, Japan

[21] Appl. No.: 136,641

[22] Filed: Oct. 13, 1993

[30] Foreign Application Priority Data

Oct. 15, 1992 [JP] Japan .................................. 4-277373

[51] Int. Cl.⁶ .................................................. G11B 21/04
[52] U.S. Cl. .............................................. 360/70; 360/27
[58] Field of Search ........................... 360/69, 70, 77.13, 360/77.12, 27, 26, 78.02, 31, 53, 75

[56] References Cited

U.S. PATENT DOCUMENTS

| 4,868,692 | 9/1989 | Nakase et al. | 360/77.13 X |
| 5,121,260 | 6/1992 | Asakawa et al. | 360/31 |
| 5,270,873 | 12/1993 | Sakai et al. | 360/27 X |
| 5,276,570 | 1/1994 | Hong et al. | 360/70 X |

FOREIGN PATENT DOCUMENTS 57-198566A  12/1982  Japan .

*Primary Examiner*—Andrew L. Sniezek
*Attorney, Agent, or Firm*—Kenyon & Kenyon

[57] ABSTRACT

A data recording and reproducing apparatus of a helical scanning system includes a unit for recording and reproducing an information signal in an oblique information track on a magnetic tape by a rotary magnetic head and a unit for recording and reproducing a control signal on the magnetic tape in a longitudinal direction thereof. Further, the data recording and reproducing apparatus includes a memory unit for storing a difference (X-value error information) between a predetermined X value and a distance (X value) between a record starting position of the information track and a recorded position of the control signal, a unit for recording X-value error information on the magnetic tape individually each time information is recorded, a unit for reproducing X-value error information on the magnetic tape, and a unit for shifting a reproduced phase of the control signal in accordance with the X-value error information.

8 Claims, 7 Drawing Sheets

DATA RECORDING AND REPRODUCING APPARATUS

BACKGROUND OF THE INVENTION

The present invention relates to a date recording and reproducing apparatus of a helical scanning system, and more particularly to tracking control using a control signal.

In a data recording and reproducing apparatus of a helical scanning system, when there is a difference (that is, a tracking error) between a recording track (hereinafter referred to as an information track) of a video signal on a magnetic tape and a scanning locus of a reproducing magnetic head, a reproduced signal is not obtained with satisfactory quality and accordingly it is necessary to perform tracking control so as to remove the tracking error.

For example, a conventional data recording and reproducing apparatus of a helical scanning system performs the so-called capstan servo tracking control in which a control signal is recorded on the magnetic tape in the longitudinal direction thereof in a manner corresponding to the information track and is reproduced by a fixed control head so that the tracking error is detected from a variation in a phase of the reproduced control signal to control a rotational phase of a capstan motor for moving the magnetic tape at a fixed speed.

However, since the control signal recorded in the longitudinal direction of the magnetic tape is recorded by a control head which is different from the rotary magnetic head recording and reproducing the video signal, the video signal can not optimally be reproduced due to a difference in the relation between the recorded position of the control signal and the position of the information track on the magnetic tape. One of the reasons thereof is that the relation of mounting positions of the control head and the rotary magnetic head is slightly different depending on each data recording and reproducing apparatus. Consequently, a distance (hereinafter referred to as an X value) between the recorded position of the control signal and a record starting position of the information track corresponding to the recorded position of the control signal is slightly different depending on each data recording and reproducing apparatus. Accordingly, when a signal recorded on a magnetic tape by a data recording and reproducing apparatus is reproduced by a different data recording and reproducing apparatus, the tracking error is increased and optimum reproduction is often impossible.

Heretofore, in order to reduce such a tracking error to be as small as possible, the tracking adjustment is made upon reproduction by the data recording and reproducing apparatus to thereby vary a phase control timing of the capstan, so that a difference in the relation of the recorded positions of the control signal and the information track is corrected. As another tracking adjustment method, a method of making an automatic tracking adjustment is known to maximize a level of a reproduced video signal.

Further, as another example, an automatic tracking control method using a wobbling method is known in which a rotary magnetic head is attached on a bimorph plate and the rotary magnetic head is position-controlled upon the reproduction so that a reproduced video signal is obtained with a maximum level while a very small vibration is given to the rotary magnetic head by the bimorph plate.

As the prior arts described above, there is an example as disclosed in Japanese Patent Document No. JP-A-57-198566, for example.

SUMMARY OF THE INVENTION

The present invention provides a data recording and reproducing apparatus adapted to obtain a best tracking state from the beginning of reproduction without the need of the tracking adjustment.

The present invention also provides a data recording and reproducing apparatus capable of obtaining a best tracking state over the whole magnetic tape recorded by a different recording apparatus without the need of tracking adjustment.

However, the technique disclosed above is limited to the case where the rotary magnetic head is used in a special manner (multi-tracking) and is very expansive. The automatic tracking control using the wobbling method has problems including an increased cost, the life of a driving actuator and control components and an increased mounting space thereof, and requires a long time to complete the adjustment so that the response characteristic of reproduction is reduced.

In such a prior art, a tracking error amount is detected by a reproduced signal level obtained from the rotary magnetic head and the detected signal is fed back to a capstan phase servo system to always make the tracking control during reproduction. However, it takes a time of about several seconds at the minimum in order to obtain the best tracking state by such a tracking control. Accordingly, in order to reproduce the information signal in the optimum tracking state from the beginning of the reproduction of the information signal, the automatic tracking control is started from the beginning of the reproduction and when the best tracking state is reached, the tracking error information at this time is held and the magnetic tape is wound back. Then, the reproduction of the information signal is made using the held tracking error information again from the beginning. Alternatively, it is necessary to provide a tracking adjustment area for making only the tracking control just before the beginning of the recorded area of the information signal. Such methods are disadvantageous to the high-speed data access.

Furthermore, in the automatic tracking control using the wobbling method, it is a matter of course that the cost thereof is increased, and large devices such as the driving actuator, control components and the like are required. Accordingly, there are problems in respect to increased mounting space and the like, and it takes a long time to complete the adjustment, so that the response characteristic in the reproduction is reduced. In addition, since the scale of the apparatus is also large, the cost, the maintenance and the reliability thereof are also disadvantageous.

In the conventional data recording and reproducing apparatus of the helical scanning system using the control signal, a distance between the recorded position of the control signal recorded in the magnetic tape and the record starting position of the information track corresponding to the recorded position of the control signal is different depending on each recording apparatus. Accordingly, when the magnetic tape on which recording is made by a plurality of different data recording and reproducing apparatuses is reproduced, the tracking state on the magnetic tape is different in each recorded area in which the recording is made by each of the data recording and reproducing apparatuses and the best tracking state can not be obtained.

The present invention solves such problems.

The data recording and reproducing apparatus of the present invention comprises X-value error memory means for storing an X-value error indicative of an error from a predetermined value of an X value representing a distance between a recorded position of a control signal and a record starting position of an information track corresponding to the recorded position of the control signal when the information signal and the control signal are recorded on a magnetic tape, means for shifting a phase of the control signal in respect to a reference signal by an amount corresponding to the X-value error upon recording and making the phase-shifted control signal to be a record control signal to the magnetic tape, and means for phase-shifting the reference signal by an amount corresponding to the X-value error upon reproduction, whereby a signal for controlling a phase of a capstan is produced on the basis of the phase-shifted reference signal and a reproduction control signal from the magnetic tape.

Further, the data recording and reproducing apparatus according to the present invention comprises X-value error memory means for storing an X-value error indicative of an error from a predetermined value, of an X value representing a distance between a recorded position of a control signal and a record starting position of an information track corresponding to the recorded position of the control signal when an information signal and the control signal are recorded on a magnetic tape, recording means for reading out the X-value error from the X-value error memory means to record it in a head area of the magnetic tape as information (header information) recorded in the vicinity of the head of the magnetic tape, means for shifting a phase of the control signal in respect to a reference signal by an amount corresponding to the X-value error stored in the memory means upon recording and making the phase-shifted control signal to be a record control signal to the magnetic tape, header information reproducing means for reproducing the header information from the header area of the magnetic tape in advance to reproduction of the information signal, and header information memory means for storing the reproduced header information, whereby a signal for controlling a phase of a capstan is produced on the basis of a phase-shifted reference signal and a reproduction control signal from the magnetic tape.

Usually, the record control signal is formed in phase-synchronism with the reference signal, while when the control signal is recorded, an error occurs from the predetermined value in the distance between the recorded position of the control signal and the record starting position of the information track corresponding to the recorded position of the control signal. Thus, according to the present invention, as described above, since the record control signal is phase-shifted in respect to the reference signal by the amount corresponding to the X-value error peculiar to the apparatus, the error from the predetermined value in the distance is removed. When the control signal is recorded in any magnetic tape, a reproduction starting timing of the information track and a reproduction timing of the control signal have a fixed relation determined by the X-value error. Accordingly, by phase-controlling the capstan motor by the capstan phase control signal obtained from the reproduced control signal and the reference signal phase-shifted by the amount corresponding to the X-value error, the best tracking state is obtained for any magnetic tape.

According to the present invention, even when recording to one magnetic tape is made by different data recording and reproducing apparatuses, the X-value errors of the respective data recording and reproducing apparatuses are recorded in the header area of the magnetic tape. Accordingly, when the information signal stored in a certain area is reproduced, the X-value error corresponding to the data recording and reproducing apparatus which has recorded the signal in that area is read out from the header area and the phase of the reference signal is shifted in accordance with the X-value error to produce the capstan phase control signal from the reproduction control signal, so that the best tracking state can be obtained over the whole magnetic tape.

As described above, according to the present invention, since the control signal CTL phase-shifted by the previously measured X-value error is recorded on the magnetic tape upon recording of the information signal, the distance between the recorded position of the control signal and the record starting position of the information track corresponding thereto can be maintained to the same value on the magnetic tape. Since the phase of the reproduction control signal is shifted by the previously measured X-value error to phase-control the capstan motor upon reproduction of the magnetic tape, the best tracking state can be obtained from the beginning of the reproduction without the need of tracking adjustment.

Furthermore, according to the present invention, even when recording is made to one magnetic tape by a plurality of different recording apparatuses, the reproduction tracking signal can be phase-shifted in accordance with the X-value error of the corresponding recording apparatus in each of the record areas of the respective recording apparatuses upon reproduction of the magnetic tape to thereby obtain the best tracking state over the whole magnetic tape.

DETAILED DESCRIPTION

Figure 2:
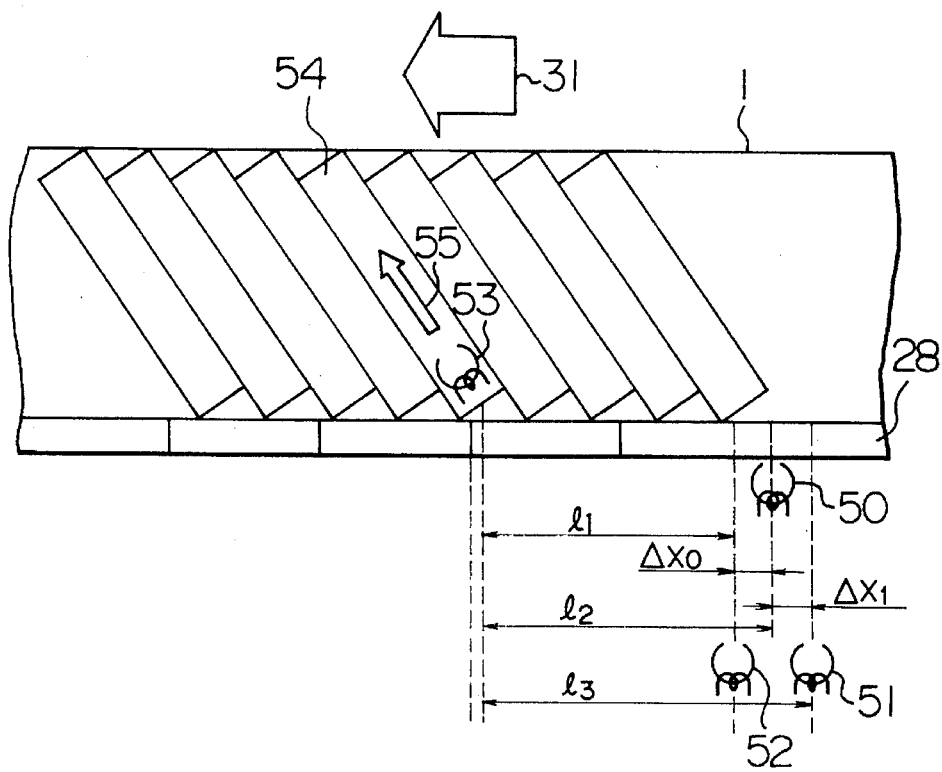
FIG. 2 is a schematic diagram illustrating a track pattern on a magnetic tape in FIG. 1.

Referring now to FIG. 2, the tracking control is described.

Oblique information tracks 54 are successively formed on a magnetic tape 1 by two alternately scanning rotary magnetic heads and the tracking control must be made upon reproduction so that rotary magnetic head 53 accurately scans the information tracks 54 in the direction of arrow 55.

In order to attain the tracking control, it is known that a control track 28 in which a control signal is stored is formed in the lower end of the magnetic tape 1 in the longitudinal direction thereof separately from the information track 54 and the control signal is reproduced from the control track to use it for the tracking control. For the simplicity of description, the tracking control in a VHS type home video tape recorder is described by way of example.

A rotary drum having two rotary magnetic heads mounted therein opposite to each other by 180 degrees are rotated with a frame frequency (30 Hz) of a video signal and each of the rotary magnetic heads forms one information track 54 in a half frame period (60 Hz). A control signal is recorded in the frame period and at a record starting time of the information track 54. Upon reproduction, movement of the magnetic tape is controlled to reproduce the control signal in synchronism with a rotational phase reference signal of the rotary drum, so that the rotary magnetic heads can accurately scan the information track.

As a problem of the tracking control, however, a distance between mounting positions of the rotary magnetic head 53 and the control head 50 (that is, an X value) is slightly different depending on the data recording and reproducing apparatus since the X value is allowed to have a predetermined tolerance. More particularly, the control head 50 shown in FIG. 2 is positioned (X value=L2) so that an X-value error is zero, the control head 51 shown in FIG. 2 is positioned (X value=L3) so that the X value has a positive error ($\Delta X0$), and the control head 52 shown in FIG. 2 is positioned (X value=L1) so that the X value has a negative error ($\Delta X1$). In this case, when the magnetic tape recorded by a data recording and reproducing apparatus having the control head 52 (X value=L1), is reproduced by another data recording and reproducing apparatus having the control head 51 (X value=L3), the reproduction head is shifted by ($\Delta X0 + \Delta X1$) in the longitudinal direction of the magnetic tape 1. Accordingly, when the tracking control is performed by the control signal reproduced from the magnetic tape 1, a tracking error corresponding to ($\Delta X0 + \Delta X1$) occurs and the best reproduction video output can not be obtained.

Heretofore, in order to reduce such a tracking error to be as small as possible, the tracking adjustment (adjustment of a reproduction timing of the control signal) is made manually or automatically in the data recording and reproducing apparatus upon the reproduction to thereby adjust correction of a difference or deviation between the recorded position of the control signal and a recording position of the information track. Alternatively, an automatic tracking control using a wobbling method is made in which a rotary magnetic head is attached on a bimorph plate and the rotary magnetic head is position-controlled upon the reproduction so that a reproduced video signal is obtained with a maximum level while very small vibration is given to the rotary magnetic head by the bimorph plate.

In the contentional techniques described above, a tracking error amount is detected from the reproduced video signal obtained from the rotary magnetic head and the capstan motor is phase-controlled in accordance with the detected output. Accordingly, it takes time of about several seconds at the minimum in order to obtain the best tracking state stably.

In order to obtain the best tracking state from the beginning of recording of the video signal on the magnetic tape, a method is considered in which the automatic tracking adjustment is made from the record starting position to obtain the tracking error information. Then, the magnetic tape is wound back to the record starting position and the video signal begins to be reproduced from the record starting position again while the automatic tracking adjustment is made using the obtained tracking error information. Alternatively, a method is considered in which a tracking adjustment area for performing the automatic tracking adjustment is provided just before the record starting position and the reproduction is started while the automatic tracking adjustment is performed from the tracking adjustment area when the video signal is reproduced.

However, such methods have a problem that high-speed data access is impossible. Specifically, when the recorded information is data for a computer there is a problem in the access characteristic and data reliability.

The embodiments of the present invention described below have been adapted to obtain the optimum tracking state from the record starting position of data without the tracking adjustment.

Figure 1:
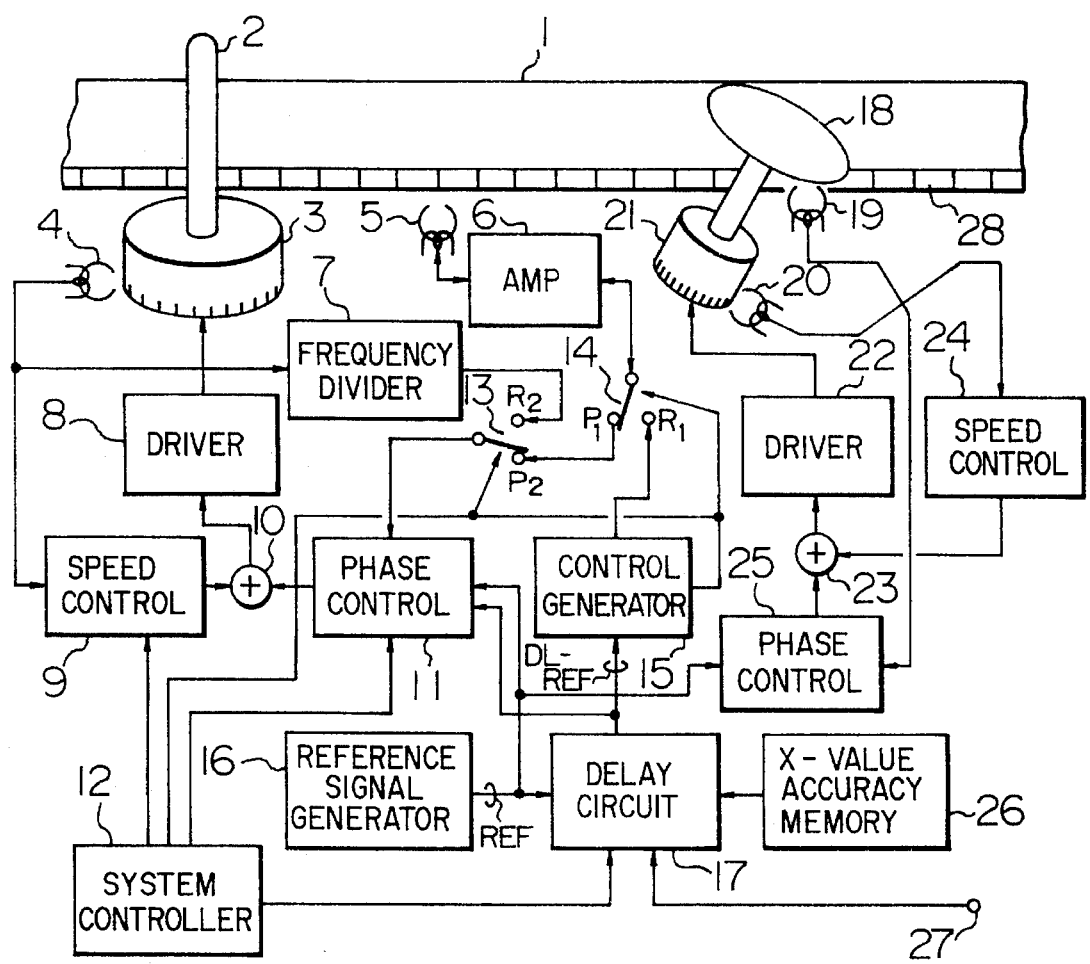
FIG. 1 is a block diagram schematically illustrating an embodiment of a data recording and reproducing apparatus according to the present invention.

FIG. 1 is a block diagram schematically illustrating an embodiment of a data recording and reproducing apparatus according to the present invention. The data recording and reproducing apparatus of FIG. 1 includes a magnetic tape 1, a capstan 2, a capstan motor 3, a capstan rotation detector 4, a control head 5, a control signal recording and reproducing amplifier 6, a frequency divider 7, a capstan motor driver 8, a capstan speed control circuit 9, an adder 10, a capstan phase control circuit 11, a system controller 12, switch circuits 13 and 14, a control signal generating circuit 15, a reference signal generating circuit 16, a delay circuit 17, a rotary drum 18, a rotary drum phase detector 19, a drum rotational speed detector 20, a drum motor 21, a drum motor driver 22, an adder 23, a drum speed control circuit 24, a drum phase control circuit 25, an X-value memory 26 in which a mounting accuracy of an X value is recorded, an input terminal 27 of a manual tracking adjustment value, and a control track 28.

In FIG. 1, upon recording, the capstan motor 3 is rotated by the capstan motor driver 8, so that the magnetic tape 1 held between the capstan 2 rotated by the capstan motor and a pinch roller (not shown) is moved in the longitudinal direction of the magnetic tape.

When the capstan motor 3 is rotated, the capstan rotation detector 4 detects a rotational speed of the capstan motor 3 to produce a signal having a frequency proportional to the rotational speed (hereinafter referred to as a CFG signal) and the CFG signal is supplied to the capstan speed control circuit 9. The capstan speed control circuit 9 produces a speed control signal of the capstan motor 3 from the frequency of the CFG signal and supplies it to the adder 10. Further, the CFG signal is frequency-divided by a factor of n in the frequency divider 7 and is supplied through the switch circuit 13 closed on the side of R2 to the capstan phase control circuit 11. The capstan phase control circuit 11 phase compares an output signal of the frequency divider 7 with a reference signal REF from the reference signal generator 16 to produce a capstan phase control signal in accordance with a phase difference and supplies the phase control signal to the adder 10. The adder 10 adds the phase control signal to the speed control signal and supplies the sum to the capstan motor driver 8 as a capstan motor control signal. The capstan motor driver 8 controls the capstan motor 3 in accordance with the capstan motor control signal.

In this manner, the capstan motor 3 is controlled to be rotated so that the CFG signal is equal to a predetermined frequency and the divided-by-n output signal of the frequency divider 7 has a predetermined phase relation to the reference signal REF, so that the magnetic tape 1 is moved with a predetermined phase at a predetermined speed.

The switch circuits 13 and 14 are closed on the side R2 and R1 in the recording operation and on the side of P2 and P1 in the reproduction operation in accordance with a control signal responsive to the recording and reproduction modes from the system controller 12, respectively.

The drum motor 21 is rotated by the drum motor driver 22 to thereby rotate the rotary drum 18 in which two rotary magnetic heads (not shown) are mounted. The two rotary magnetic heads are disposed opposite to each other in the rotary drum 18 at intervals of 180 degrees and scan the magnetic tape 1 alternately every half rotation of the rotary drum 18. The magnetic tape 1 is moved while being wound on the rotary drum 18 spirally overy about 180 degrees and an information signal is recorded on the magnetic tape 1 by the rotary magnetic head. Thus, the information track is formed on the magnetic tape 1 as shown in FIG. 2.

When the drum motor 21 is rotated, the drum rotational speed detector 20 detects the rotational speed of the rotary drum 18 to produce a signal (hereinafter referred to as a DFG signal) having a frequency proportional to the rotational speed and supplies the signal to the drum speed control circuit 24. The drum speed control circuit 24 forms a speed control signal of the drum motor 21 from the frequency of the DFG signal and supplies the speed control signal to the adder 23. Further, the rotary drum phase detector 19 detects a rotational phase of the rotary drum 18 to produce a DPG signal and supplies the signal to the drum phase control circuit 25. The drum phase control circuit 25 phase-compares the DPG signal with the reference signal REF from the reference signal generator 16 to produce a rotary drum phase control signal in accordance with a phase difference thereof and supplies the signal to the adder 23. The adder 23 adds the speed control signal to the phase control signal and supplies the sum to the drum motor driver 22 as a drum motor control signal. Thus, the drum motor 21 is controlled by the drum motor control signal to be rotated so that the frequency of the DFG signal is equal to a predetermined frequency and the DPG signal and the reference signal REF have a predetermined phase relation.

Recording of a control signal CTL which is most important in the embodiment is now described. In the embodiment, the control signal CTL is phase-shifted by the X-value error set in the embodiment so that a distance between the recorded position of the control signal and the record starting position of the information track corresponding to the recorded position of the control signal is always the same.

In FIG. 1, the reference signal REF produced by the reference signal generator 16 is delayed by the delay circuit 17 and supplied to the record CTL generating circuit 15 as a delayed reference signal DL-REF. The record CTL generating circuit 15 produces a record control signal CTL on the basis of the delayed reference signal DL-REF. Accordingly, a phase of the record control signal CTL is dependent on a delay amount of the delay circuit 17 and accordingly the record control signal CTL can be phase-shifted arbitrarily by setting the delay amount properly. The record control signal CTL is supplied through the switch circuit 14 and the amplifier 6 to the control head 5 and recorded in the control track 28 as shown in FIG. 2.

Figure 3:
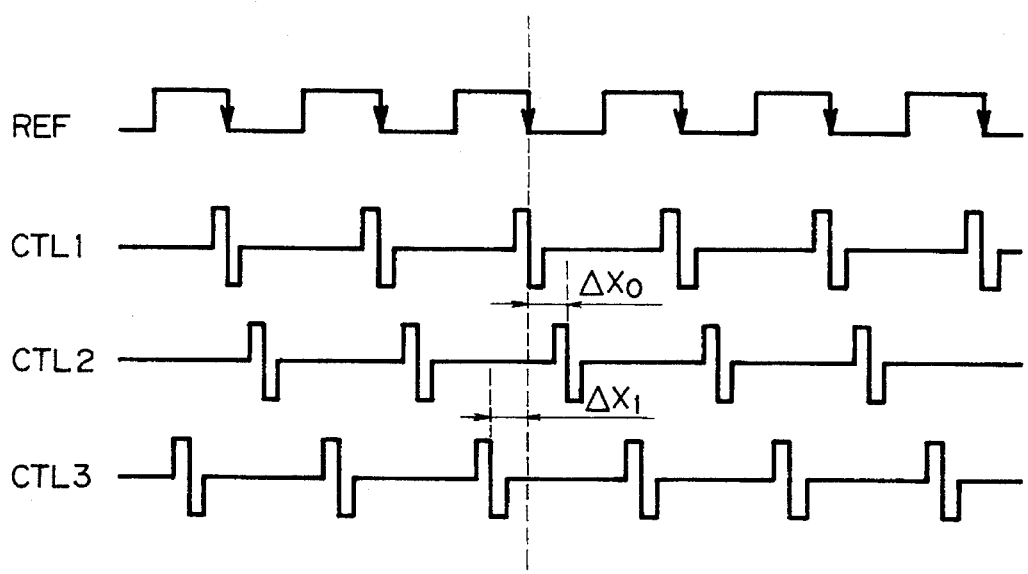
FIG. 3 schematically illustrates phases of reproduction control signals in respect to X-value errors of FIG. 2.

FIG. 3 is a waveform diagram showing the phase-shifted record CTL obtained above. The same reference symbols are given to the signals corresponding to those of FIG. 1.

In FIG. 3, the waveforms CTL1, CTL2 and CTL3 represent the record control signals CTL corresponding to the reference signals REF of three different data recording and reproducing apparatuses having different X-value errors of $\pm 0$, $\Delta X0$ and $\Delta X1$ (FIG. 2), respectively. In this manner, by recording the control signals phase-shifted by the amounts corresponding to the X-value errors, the distance between the recorded positions of the control signals recorded by the data recording and reproducing apparatuses and the record starting position of the information track corresponding thereto can always be the same.

In FIG. 1, the X-value errors are stored in the X accuracy memory 26 and the delay value of the delay circuit 17 is set in accordance with the X-value error. Accordingly, the record control signal CTL obtained on the basis of the delayed reference signal DL-REF produced by the delay circuit 17 is phase-shifted in accordance with the X-value error. Thus, even in another data recording and reproducing apparatus having the same configuration as that of the embodiment, the distance between the recorded position of the control signal and the record starting position of the information track corresponding thereto is the same.

A method of producing the X-value error stored in the X accuracy memory 26 will be described later.

Reproduction operation of the embodiment if now described.

In the reproduction operation, the switch circuits 13 and 14 are closed on the side of P2 and P1, respectively. The control of the drum motor 21 and the speed control of the capstan motor 3 are the same as in the recording operation and description thereof is omitted.

The phase control of the capstan motor 3 in the reproduction is made as follows.

The control signal (hereinafter referred to as a reproduction control signal) CTL reproduced from the control track 28 of the magnetic tape 1 by the control head 5 is amplified by the amplifier 6 and is then supplied through the switch circuits 14 and 13 to the capstan phase control circuit 11. The capstan phase control circuit 11 phase-compares the reproduction control signal CTL with the delayed reference signal DL-REF from the delay circuit 17 and produces the phase difference signal thereof as the capstan phase control signal.

A phase difference of the delayed reference signal DL-REF at this time with respect to the reference signal REF of the reference signal generator 16 corresponds to the X-value error stored in the X-value accuracy memory 26. More particularly, even if the magnetic tape 1 is recorded by any data recording and reproducing apparatus, the distance between the recorded position of the control signal CTL and the record starting position of the information track corresponding thereto in the magnetic tape 1 is the same. Furthermore, the X-value error stored in the X-value accuracy memory 26 represents a deviation with respect to this distance, of the distance between the recorded position of the control signal CTL and the record starting position of the information track corresponding thereto in the data recording and reproducing apparatus. Accordingly, the phase of the delayed reference signal DL-REF produced from the delay circuit 17 having the delay value in accordance with the X-value error stored in the X-value accuracy memory 26 has a predetermined stable relation to the phase of the reproduction control signal obtained when the magnetic tape 1 is being moved in the best tracking state.

The capstan phase control signal produced by the capstan phase control circuit 11 is added to the capstan speed control signal in the adder 10 and is supplied to the capstan motor driver 8. Accordingly, the capstan motor 3 is phase-controlled so that the reproduction control signal and the delayed reference signal DL-REF have a predetermined phase relation to thereby obtain the best tracking state.

As described above, in the embodiment, the best tracking state can be obtained from the beginning of the reproduction without the need of the phase adjustment of the reproduction control signal CTL in the reproduction operation and the high-speed access and the high reliability of data can be attached. Even in the recording operation, since the X-value error is previously stored, the phase of the record control signal CTL is set to a desired value from the beginning of the recording operation and it is not necessary to adjust the phase.

In the reproduction operation, when the tracking adjustment is made by manual operation of the user or the conventional automatic control, delay value information is input from the input terminal 27 and a delay value of the delay circuit 17 is set in accordance with the inputted delay value by control of the system controller 12. Accordingly, by changing the delay value information from the input terminal 27, the tracking state can be adjusted.

Figure 4:
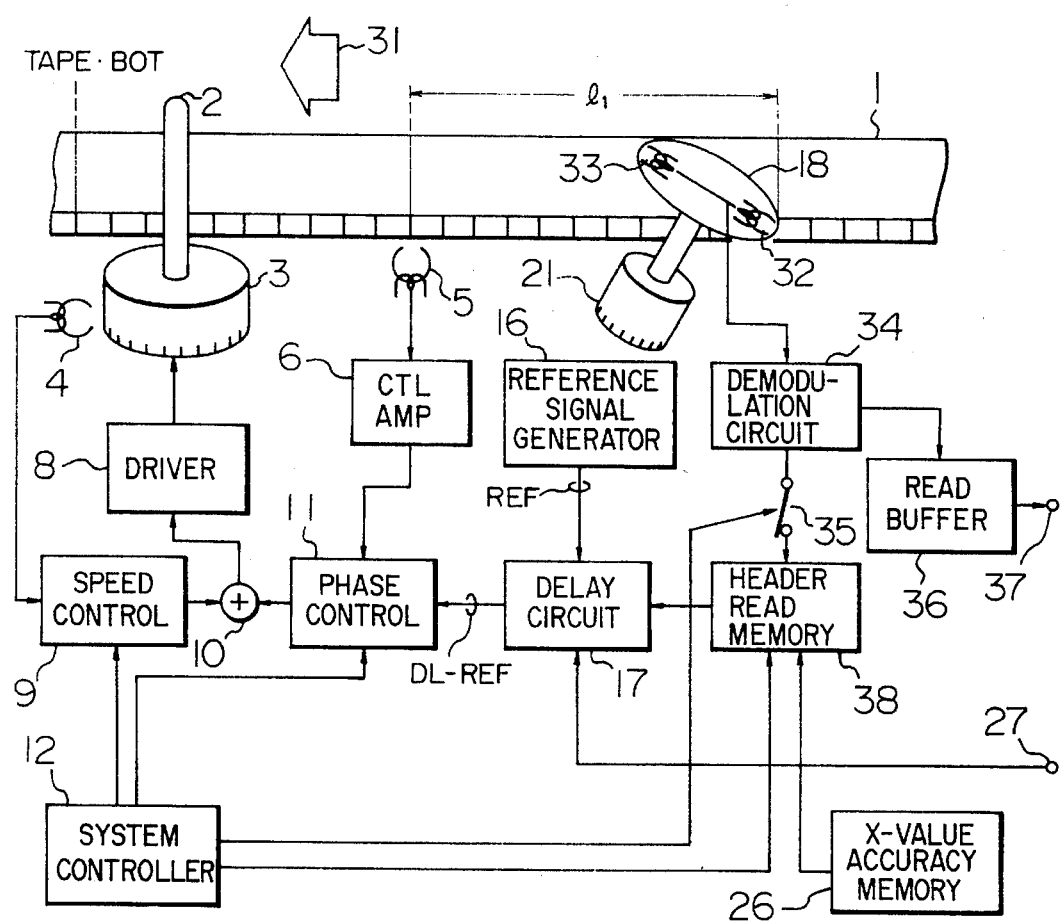
FIG. 4 is a block diagram schematically illustrating another embodiment of a data recording and reproducing apparatus according to the present invention.

FIG. 4 is a block diagram schematically illustrating another embodiment of a data recording and reproducing apparatus according to the present invention. Reference numeral 31 represents a moving direction of the magnetic tape. 32 and 33 denote rotary recording and reproducing heads, 34 a demodulation circuit, 35 a switch circuit, 36 a read buffer, 37 a reproduced data output terminal, and 38 a header read memory. Portions corresponding to those of FIG. 1 are designated by the same reference numerals and duplicate description is omitted.

The embodiment of FIG. 4 is adapted to be able to obtain the best tracking state without the phase adjustment of the reproduction tracking signal in the reproduction operation even for a magnetic tape recorded by another data recording and reproducing apparatus having no X-value error memory, that is, the magnetic tape recorded without the phase shift of the control signal in accordance with the X-value error.

Figure 5:
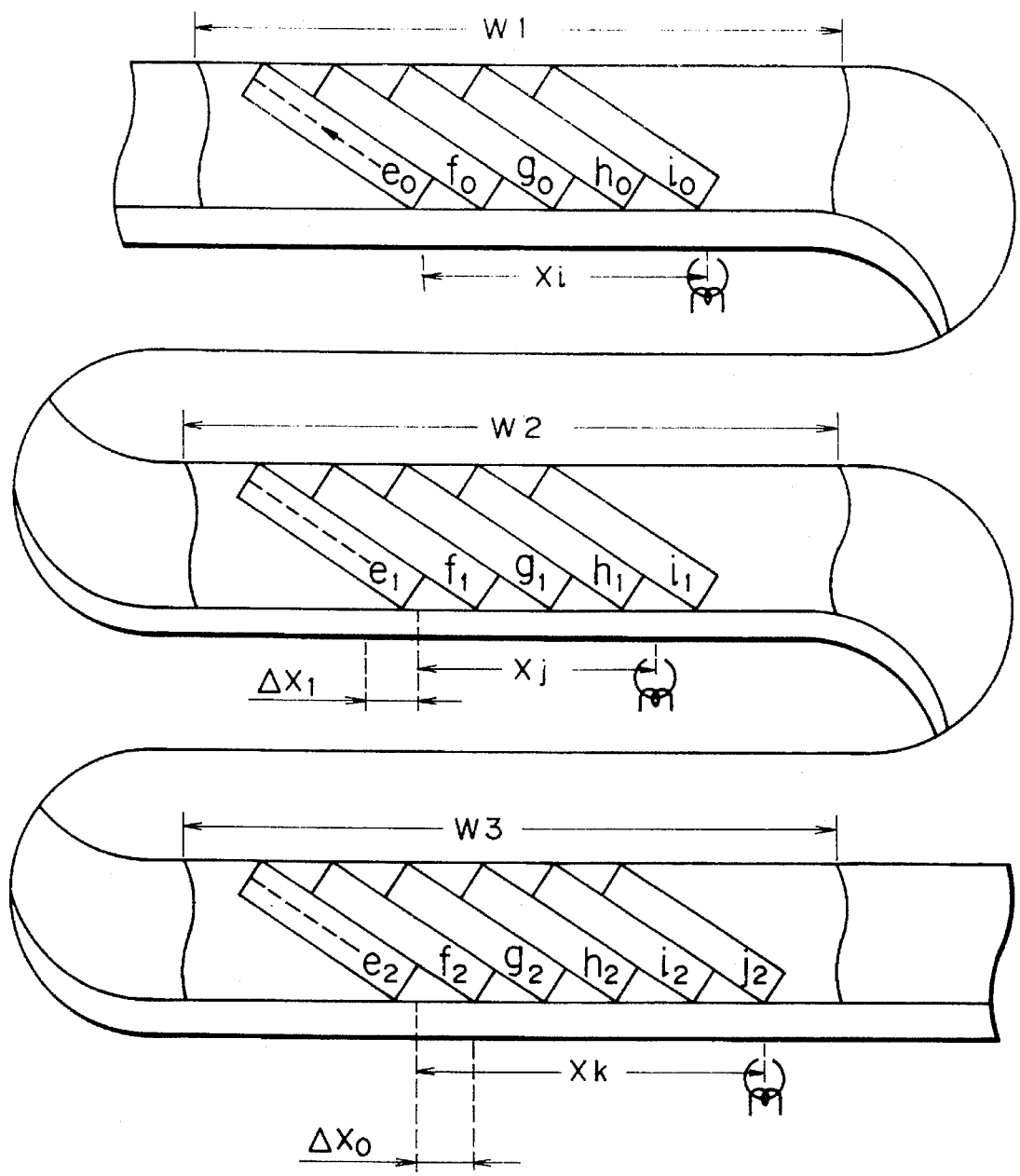
FIG. 5 is a schematic diagram illustrating an example of a track pattern on the magnetic tape in FIG. 4.

Referring now to FIG. 5, description is made relating to the magnetic tape in which the control signal is recorded without the phase shift by a plurality of data recording and reproducing apparatuses having different X-value errors.

In FIG. 5, W1, W2 and W3 represent areas recorded by dam recording and reproducing apparatuses having different X values, respectively. When X values of the recorded areas W1, W2 and W3 are Xi, Xj and Xk, respectively, and the Xi is a normal X value having no error, the following equations are given $$\Delta X1 + Xj = Xi$$

$$\Delta X0 + Xk = Xi$$

Information track patterns including X-value errors of $\Delta X1$ and $\Delta X0$ are formed in the recorded areas W2 and W3, respectively.

In FIG. 4, the magnetic tape 1 is formed with such track patterns. In the embodiment, information (X-value error information) indicative of X-value errors 0, $\Delta X1$ and $\Delta X0$ of the respective data recording and reproducing apparatuses which have made the recording in the recorded areas W1, W2 and W3, respectively, is all recorded in a predetermined area (hereinafter referred to as a header area) of the head of the magnetic tape 1. When the information signal is reproduced, the X-value error information is read from the header area of the magnetic tape 1, and the X-value errors corrected on the basis of the X-value error of the embodiment serving as a reproducing apparatus and the X-value errors corresponding to the recorded areas W1, W2 and W3 to be reproduced are obtained. The delayed reference signal phase-shifted in accordance with the corrected X-value errors is compared with the reproduction control signal to perform the phase control of the capstan motor.

Figure 6:
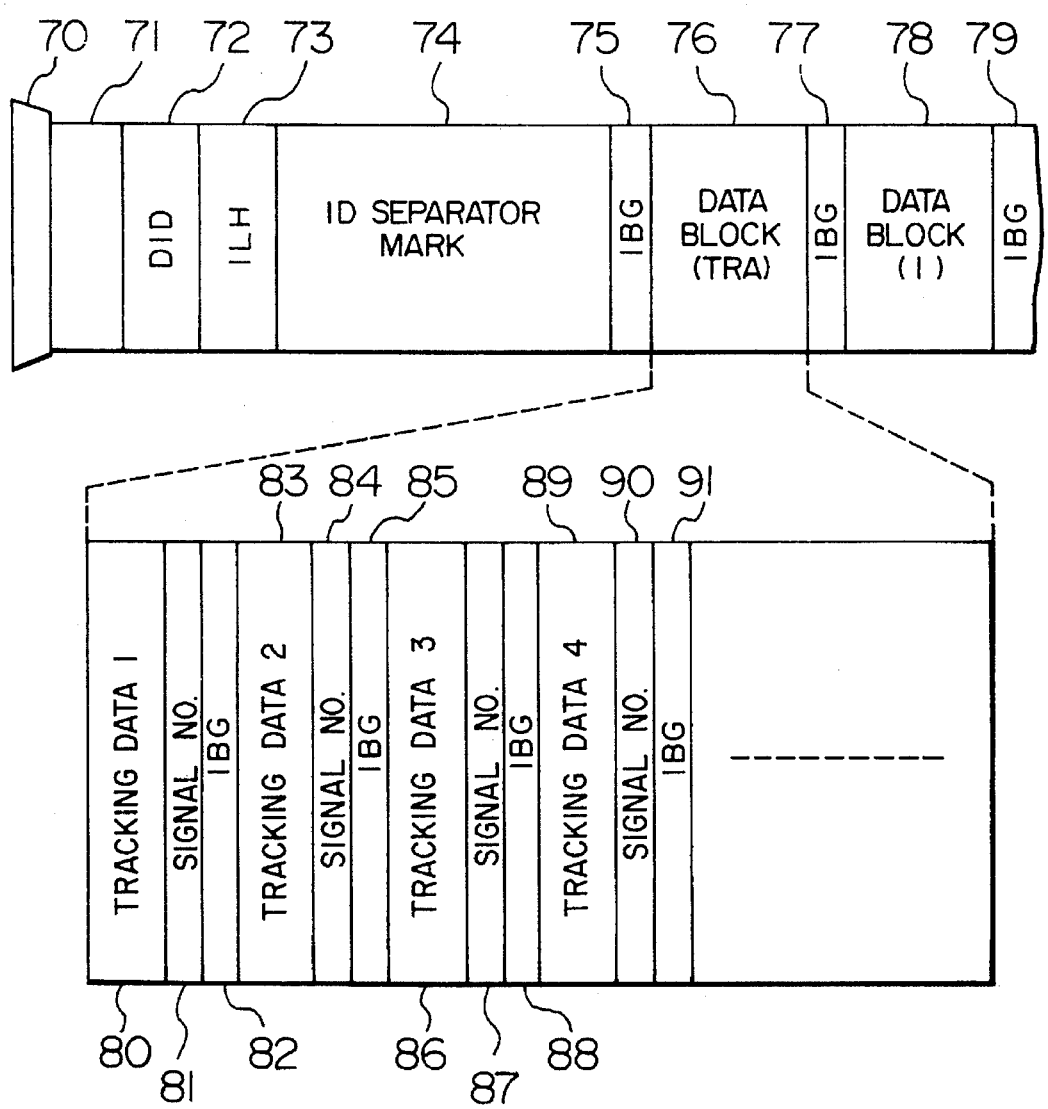
FIG. 6 is a diagram showing a format of header information recorded in the head of the magnetic tape in FIG. 4.

FIG. 6 shows a definite example of a format of the header information in the header area. Numeral 70 denotes a leader block, 71 an unused area, 72 an area in which information DID indicative of the head of the magnetic tape is recorded, 73 an area in which information ILH such as an index and a volume label of the magnetic tape is recorded, 76 a tracking data area in which all tracking data of the magnetic tape is recorded, 78 a data area, and 75, 77 and 79 gaps IBG for separating the tracking areas 74, 76 and 78.

The tracking data area 76 includes areas 80, 83, 86 and 89 in which X-value error information of the data recording and reproducing apparatuses which recorded the information signals in the magnetic tape is recorded, areas 81, 84, 87 and 90 in which serial numbers of the data recording and reproducing apparatuses which recorded the information signals in the magnetic tape are recorded, areas 82, 85, 88 and 91 for gaps IBG for separating between combinations each having the area in which the X-value error information is recorded and the area in which the serial number is recorded.

In the embodiment, the information signal recorded in the magnetic tape 1 is data handled by the computer and exchange of the magnetic tape (exchange of a cassette tape) is always made in a state that the magnetic tape is wound back perfectly to the head of the magnetic tape. Accordingly, reading and writing to the header area of the magnetic tape as shown in FIG. 6 are made collectively upon loading or unloading of the magnetic tape 1 (loading or unloading of the tape to the rotary drum 18).

Figure 7:
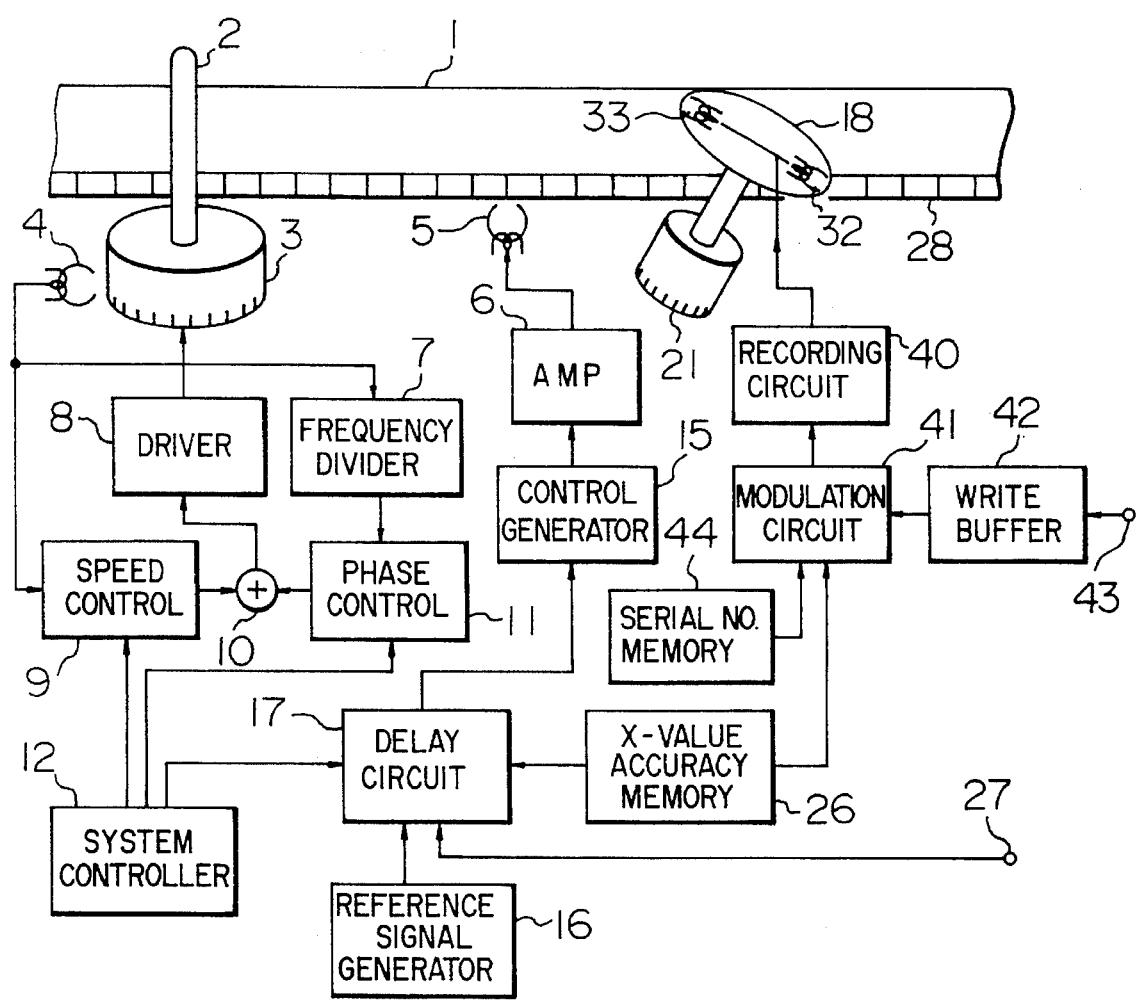
FIG. 7 is a block diagram schematically illustrating a definite example of a recording method of the header information in the embodiment shown in FIG. 4.

Referring now to FIG. 7, the writing operation to the header upon the unloading of the magnetic tape is described. In FIG. 7, numeral 40 denotes a recording circuit, 41 a modulation circuit, 42 a write buffer, 43 an input terminal of a record information signal and 44 a memory in which a serial number of the data recording and reproducing apparatus used as a recording apparatus is recorded. Portions corresponding to those of the preceding drawings are designated by the same reference numerals and descriptions thereof is omitted. Further, FIG. 7 shows only constituent portions required for the recording.

In FIG. 7, the X-value error information of the data recording and reproducing apparatus is stored in the X-value accuracy memory 26 and the serial number of the data recording and reproducing apparatus is stored in the memory 44.

On the other hand, the information signal to be recorded is input from the input terminal 43 and stored in the write buffer 42. The information signal is delayed in the write buffer 42 so that the information signal is read out from the write buffer 42 when the magnetic tape 1 reaches a position for recording the information signal. Then, the information signal is supplied to the modulator 41 and is modulated to be supplied to the rotary magnetic heads 32 and 33 through the recording circuit 40. Thus, the information signal is recorded in the magnetic tape 1 from the predetermined position.

When the recording of the information signal is completed, the magnetic tape 1 is wound back. When the magnetic tape 1 is wound back to the head thereof completely, the recording mode is set again. The tracking data corresponding to the X-value error and the serial number data of the data recording and reproducing apparatus are read from the X-value accuracy memory 26 and the memory 44, respectively, and are modulated by the modulator. Then, both of the tracking data and the serial number data are supplied to the rotary magnetic heads 32 and 33 through the recording circuit 40. The tracking data and the serial number data are recorded in the header area provided in the head of the magnetic tape 1 as shown in FIG. 6.

The reading operation of the tracking information (X-value error) recorded in the head of the magnetic tape 1 upon loading of the tape is now described with reference to FIG. 4.

When the loading of the magnetic tape 1 described above has been made for the reproduction, the magnetic tape 1 begins to be moved from its starting end and the reading operation of the header is started.

The rotary magnetic heads 32 and 33 scan the magnetic tape 1 from its head, so that the reproduction signal is obtained and is supplied to the demodulation circuit 34 to be demodulated. In this case, when the rotary magnetic heads 32 and 33 scan the magnetic head 1 for the reproduction from the head of the tape in which the header information shown in FIG. 6 is recorded, the switch circuit 35 is closed by the system controller 12 and the output signal of the demodulation circuit 34 is supplied through the switch circuit 35 to the header read memory 38 to be stored therein. When the reproduction of the header information is completed, the information signal begins to be reproduced. At the same time, the predetermined X-value error is read out from the header read memory 38 in response to a command from the system controller 12 to thereby correct its own X-value error from the X-vale accuracy memory 26 to supply it to the delay circuit 17. Consequently, the delay circuit 17 sets the delay value in accordance with the corrected X-value error in the same manner as in the preceding embodiment and delays the reference signal REF from the reference signal generator 16 to thereby produce the delayed reference signal DL-REF and supply it to the capstan phase control circuit 11.

Thus, the optimum tracking state is set and the information signal is reproduced. The information signal is demodulated by the demodulation circuit 34 and then outputted through the read buffer 36 from the output terminal 37. In this case, the X-value errors corresponding to the difference recording apparatuses are read out from the header read memory 38 every recording area of the magnetic tape 1 for the different recording apparatuses, so that its own X-value error supplied from the X-value accuracy memory 26 is corrected and supplied to the delay circuit 17. Accordingly, the optimum tracking state is set over the whole recording area of the magnetic tape 1.

In the capstan phase control upon the reproduction operation, the capstan phase control signal is produced by the capstan phase control circuit 11 on the basis of the delayed reference signal DL-REF from the delay circuit 17 and the control signal reproduced by the control head to 5 to thereby control the rotational phase of the capstan motor 3.

As described above, in the embodiment, even if the recording is made on one magnetic tape by different data recording and reproducing apparatuses, the best tracking state is obtained over the whole magnetic tape without requiring a tracking adjustment.

In the embodiment, the reason why the serial number is recorded for each record information signal is as follows.

When the magnetic tape 1 recorded by a plurality of data recording and reproducing apparatuses as shown in FIG. 5 if reproduced, some of the recorded areas often have a bad reproduction state. The cause thereof is mostly due to trouble in the recording apparatus. Such a recording apparatus having the trouble must be detected urgently. In order to detect the recording apparatus having the trouble, the serial number is recorded in the head of the magnetic tape 1. Thus, since the recording apparatus which has made the recording in the record area from which the reproduction is being made currently can be identified by the serial number, the magnetic head which has made the recording in the record area, that is, an unusual magnetic head can be identified immediately when the reproduction state in the recorded area is bad. Accordingly, it is greatly effective to attain maintenance.

Figure 8:
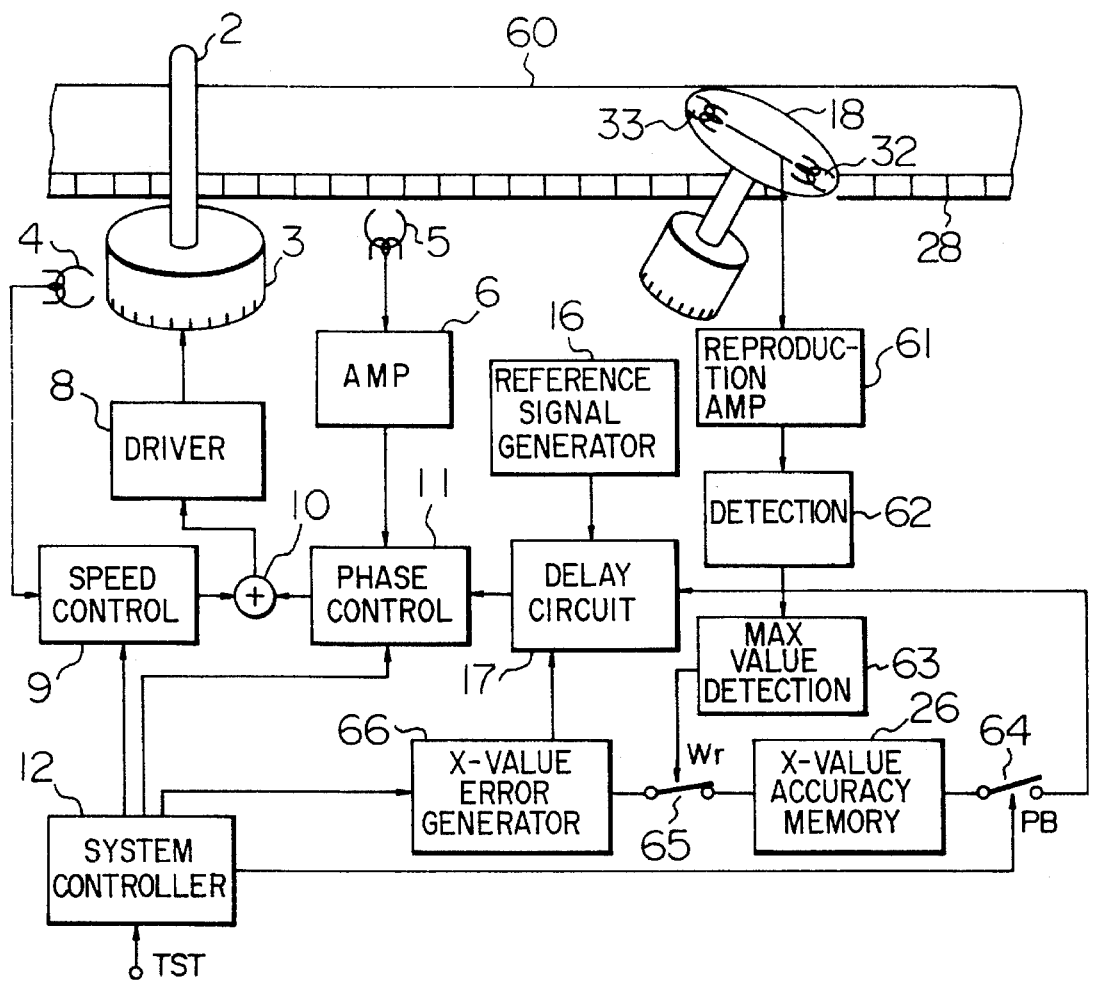
FIG. 8 is a block diagram schematically illustrating a definite example of a recording method to an X-value accuracy memory and a measurement method of an X-value error in the embodiments.

In the embodiments described above, a method of producing the X-value error stored in the X-value accuracy memory 26 is now described with reference to FIG. 8. In FIG. 8, numeral 60 denotes a magnetic tape, 61 a reproduction amplifier, 62 a detection circuit, 63 a maximum value detection circuit, 64 and 65 switch circuits, and 66 a tracking data (X-value error) generator. Portions corresponding to those of the preceding drawings are designated by the same reference numerals and description thereof is omitted.

The magnetic tape 60 used in FIG. 8 is recorded by the data recording and reproducing apparatus having the X-value error equal to zero and is hereinafter named an alignment tape.

The alignment tape 60 is reproduced by the rotary magnetic heads 32 and 33. The reproduced signal is amplified by the reproduction amplifier 61 and an amplitude thereof is then detected by the detection circuit 62, which produces and output signal in accordance with the amplitude thereof. The output signal of the detection circuit 62 is supplied to the maximum value detection circuit 63, which produces a write signal Wr when a level of the output signal is the maximum On the other hand, the tracking data generator 66 produces the tracking data (X-value error) while changing it successively by control of the system controller 12 and supplies the tracking data to the delay circuit 17 and the switch circuit 65. Thus, the delay value of the delay circuit 17 is varied with the change of the tracking data and the tracking state is varied in response to the variation of the delay value. Accordingly, when the output level of the detection circuit 62 is increased as the tracking state becomes better and reaches the maximum output level, the maximum value detection circuit 63 produces the write signal Wr. The switch circuit 65 is closed in response to the write signal Wr and the tracking data produced by the tracking data generator 66 is supplied to the X-value accuracy memory 26 through the switch circuit 65 to be written therein. The tracking data written in the X-value accuracy memory 26 is the tracking data in the case where the best tracking state is obtained in the data recording and reproducing apparatus.

As described above, by reproducing the alignment tape, the X-value error of the data recording and reproducing apparatus can be detected easily. Such an operation is made by indicating to the system controller 12 as a test mode TST, while the test mode may be performed only once.

We claim:

1. A data recording and reproducing apparatus of a helical scanning system, comprising:

means for recording and reproducing an information signal in an oblique information track on a magnetic tape by a rotary magnetic head;

means for generating a reference signal;

means for generating a control signal in synchronism with said reference signal;

means for recording said control signal on the magnetic tape in a longitudinal direction of the magnetic tape;

means for reproducing said control signal from said magnetic tape;

tracking control signal generating means for generating a tracking control signal to control said reference signal and said reproduced control signal to attain a predetermined phase relationship therebetween;

means for determining a difference between a predetermined value and a distance between a record starting position of said information track and a recorded position of said control signal;

means for storing said determined difference; and means for changing said predetermined phase relationship in accordance with said difference stored in said memory means.

2. A data recording and reproducing apparatus according to claim 1, further comprising means for determining said stored difference, comprising:

means for reproducing signals from a reference tape which was recorded beforehand by a data recording and reproducing means whose difference value is zero, means for detecting a reproduction level of an information signal from said information track, and means for generating said tracking control signal so that the reproduction level becomes a maximum level.

3. A data recording and reproducing apparatus according to claim 1, further comprising:

means for reproducing said stored difference from a predetermined position on said magnetic tape in response to an operation of loading a magnetic tape on a rotary magnetic head; and means for recording said stored difference in a predetermined position on the magnetic tape for each information signal when recording and reproducing operation to the magnetic tape is completed.

4. A data recording and reproducing apparatus according to claim 1, further comprising means for recording information unique to the data recording and reproducing apparatus in combination with information corresponding to said stored difference in a predetermined position on the magnetic tape.

5. A data recording and reproducing apparatus of a helical scanning system, comprising:

means for recording and reproducing an information signal in an oblique information track on a magnetic tape by a rotary magnetic head;

means for generating a reference signal;

means for generating the control signal in synchronism with said reference signal;

means for recording said control signal on the magnetic tape in a longitudinal direction of the magnetic tape;

means for reproducing said control signal from said magnetic tape;

tracking control signal generating means for generating a tracking control signal to control said reference signal and said reproduced control signal to attain a predetermined phase relationship therebetween;

means for determining difference error information corresponding to a difference between a distance between a record starting position for each helical track and a recording position of the control signal which is recorded each time in synchronism with the recording on the information track, and a true distance value which is prescribed beforehand;

means for recording said determined difference error information individually at a record starting time in a predetermined area on the magnetic tape with respect to the longitudinal direction of the tape;

means for reproducing said recorded difference error information from the magnetic tape; and means for changing said predetermined phase relationship in accordance with said reproduced difference error information.

6. A data recording and reproducing apparatus according to claim 5, wherein said means for determining difference error information includes:

means for reproducing signals from a reference tape which was recorded beforehand by a data recording and reproducing means whose difference error information is zero, means for detecting a reproduction level of an information signal from said information track, and means for generating said tracking control signal so that the reproduction level becomes a maximum level.

7. A data recording and reproducing apparatus according to claim 5, further comprising:

means for reproducing difference error information in response to an operation of loading a magnetic tape on a rotary magnetic head; and means for recording difference error information in a predetermined position on the magnetic tape for each information signal when a recording and reproducing operation to the magnetic tape is completed.

8. A data recording and reproducing apparatus according to claim 5, further comprising means for recording and reproducing information unique to the data recording and reproducing apparatus in combination with said difference error information in a predetermined position on the magnetic tape.

* * * * *

UNITED STATES PATENT AND TRADEMARK OFFICE
CERTIFICATE OF CORRECTION

PATENT NO. : 5,500,775
DATED : 19 March 1996
INVENTOR(S) : Kouji FUJITA et al.

It is certified that error appears in the above-indentified patent and that said Letters Patent is hereby corrected as shown below:

| | | |
|---|---|---|
| 9 | 38 | Change "dam" to --data--. |
| 12 | 67 | Before "said" insert --generation of--. |
| 13 | 1 | After "and" insert --reproduction of--; delete "reproduced". |
| 13 | 6 | After "signal" insert --during reproduction--. |
| 13 | 10 | Delete "memory"; after "means" insert --for storing--. |
| 13 | 45 | Change "the" to --a-- |
| 14 | 2 | Before "said" insert --generation of--. |
| 14 | 3 | Before "said" insert --reproduction of--. |

Signed and Sealed this

Twenty-second Day of October, 1996

Attest:

BRUCE LEHMAN

Attesting Officer            Commissioner of Patents and Trademarks

UNITED STATES PATENT AND TRADEMARK OFFICE
CERTIFICATE OF CORRECTION

PATENT NO. : 5,500,775
DATED : 19 March 1996
INVENTOR(S) : Kouji FUJITA et al.

It is certified that error appears in the above-indentified patent and that said Letters Patent is hereby corrected as shown below:

| Column | Line | |
|---|---|---|
| 1 | 6 | Change "date" to --data--. |
| 5 | 28 | After "...L1)" delete ",". |
| 7 | 10 | Change "overy" to --over--. |
| 8 | 19 | Change "if" to --is--. |

Signed and Sealed this

Tenth Day of December, 1996

Attest:

BRUCE LEHMAN

Attesting Officer     Commissioner of Patents and Trademarks